United States Patent

Ikehara

[11] Patent Number: 6,109,253
[45] Date of Patent: Aug. 29, 2000

[54] METHOD USING A WIRE FEEDING DEVICE FOR A MULTI-WIRE SAW

[75] Inventor: Masahiro Ikehara, Nara, Japan

[73] Assignee: Sharp Kabushiki Kaisha, Osaka, Japan

[21] Appl. No.: 09/296,525

[22] Filed: Apr. 22, 1999

Related U.S. Application Data

[62] Division of application No. 08/675,292, Jul. 1, 1996, abandoned.

[30] Foreign Application Priority Data

Jul. 31, 1995 [JP] Japan .................................. 7-195265

[51] Int. Cl.$^7$ ........................................................ B28D 1/08
[52] U.S. Cl. .............................. 125/12; 125/16.02; 125/21
[58] Field of Search ........................ 83/651.1; 125/16.01, 125/16.02, 21, 12

[56] References Cited

U.S. PATENT DOCUMENTS

| | | |
|---|---|---|
| 4,494,523 | 1/1985 | Wells . |
| 4,574,769 | 3/1986 | Ishikawa . |
| 4,903,682 | 2/1990 | Kurokawa . |

FOREIGN PATENT DOCUMENTS

| | | |
|---|---|---|
| 55-112754 | 8/1980 | Japan . |
| 55-112755 | 8/1980 | Japan . |
| 752149 | 2/1995 | Japan . |
| 743888 | 6/1980 | U.S.S.R. . |

Primary Examiner—Timothy V. Eley

[57] ABSTRACT

A wire feeding device for use in a multi-wire saw wherein a single wire, one end of which is connected to a feed reel, the other is connected to a collecting reel, is spirally wound between at least two work rollers arranged in parallel, a fixed distance apart, so that turns of the spirally wound wire are separated at predetermined intervals, is constructed so that the feeding speed v of the wire in the process of cutting a workpiece is controlled in association with the variation of the contact length $l_x$ of the wire with the workpiece in the process of cutting the workpiece. Thus, it is possible to maintain the abraded amount of the wire at constant at all cutting sites in the workpiece to be cut, and furthermore, the waste removed at cutting can become the same throughout the entire part of each cutting plane, so that the thickness can be uniform within the surface of the sliced piece.

3 Claims, 6 Drawing Sheets

METHOD USING A WIRE FEEDING DEVICE FOR A MULTI-WIRE SAW

This application is a divisional of application Ser. No. 08/675,292, filed on Jul. 1, 1996 now abandoned, the entire contents of which hereby incorporated by reference.

BACKGROUND OF THE INVENTION (1). Field of the Invention

The present invention relates to a wire feeding device, particularly relating to a wire feeding device for a multi-wire saw, in which a single wire, one end of which is connected to a feed reel and the other end is connected to a collecting reel, is spirally wound between at least two work rollers arranged in parallel, a fixed distance apart, so that the turns of the spirally wound wire are separated at predetermined intervals.

(2). Description of the Prior Art

FIGS. 1 and 2 shows an example of the multi-wire saw. FIG. 1 is a front view of the apparatus and FIG. 2 is an enlarged top view showing work rollers of the apparatus.

The multi-wire saw includes at least two (just two, in this example) cylindrical work rollers 1 and 2 on which spiral grooves 11 and 21 are formed for tensioning a wire 3. The rollers 1 and 2 are arranged so that the central axes of each roller is in a horizontal direction and in parallel with each other. The single wire 3 is wound around the spiral grooves 11 and 21 of the two work rollers 1 and 2, to form a multiple number of stretched sections of the wire 3 (see FIG. 2). The wire 3 is connected at one end to a feed reel 4 and the other end is connected to a collecting reel 5.

That is, while being tensioned by right and left weights 9a and 9b, the wire 3 is stretched via fixed pulley wheels 6, 6 . . . , running pulley wheels 7a, 7b, 8a and 8b, and the two work rollers 1 and 2, so that the wire can be taken up from the feed reel 4 to the collecting reel 5. In addition, the running pulley wheels 7a and 7b are alternately moved up and down so that the wire 3 will reciprocate.

When a workpiece 10 is moved upward (in the Z-direction) so as to abut the tension-stretched single wire which, while being soaked with an abrasive liquid, is made to run lengthways at a high speed from the feed reel 4 side toward the collecting reel 5 side, the workpiece 10 is simultaneously cut into a plurality of sliced pieces 10a, 10a. . . .

For the multi-wire saws, there are two types of running methods for the wire 3, the first one is a one-way running type and the other is a reciprocating running type.

In the case of the one-way running type, the wire 3 is made to constantly run at a high speed from the feed reel 4 side toward the collecting reel 5 side. Hence, the rate of feeding the wire 3 coincides with the running speed of it at any time.

In contrast, consider a case of the reciprocating running type, where 4 m, for example, of the wire 3 is delivered from the feed reel 4 side to the collecting reel side 5 thereafter 3.5 m, for example, of the wire is returned from the collecting reel 5 side to the feed reel 4 side and this cycle is repeated in a period of 2 sec, for example. The running speed of the wire 3 in this case will be 15 m/min. The running speed of the wire 3 which determines the machining performance is determined by the angular acceleration of the work rollers 1 and 2, and can be set at 200 m/min or more, for example. That is, in the case of the reciprocating running type, the rate of feeding the wire 3 will not necessarily coincide with the running speed of it.

Here, consider a case in which the workpiece 10 to be cut has a cylindrical shape, for example. That is, consider a workpiece having a circular cut face or a cut face whose contact length with the wire 3 varies in the process of cutting.

In this case, the workpiece 10 is worn away and cut in the presence of the abrasive liquid. At the same time, the wire 3 is also worn away by the abrasive liquid. Accordingly, the diameter of the wire 3 on the collecting reel 5 side becomes smaller than that on the feed reel 4 side. In this case, if the pitch of the spiral grooves 11 and 21 formed around the work roller 1 and 2 is constant, the sliced cylinder pieces gradually becomes thicker toward the collecting reel 5 side (toward the upper side in FIG. 2). In order to compensate for the cylinder pieces gradually becoming thicker, the distances between the grooves around the work rollers 1 and 2, (namely, p1, p2, . . . , p240; here p1 is on the feed reel 4 side and p240 is on the collecting reel 5 side) are designed so that p1 >p2 >. . . >p240.

FIGS. 3A to 3F are views showing the variation in the diameter of the wire 3 during the course of the cutting and the change of the thickness of the sliced pieces of the workpiece 10 when the cylindrical workpiece 10 is machined. In each of the figures, the left figure portion is a sectional view taken on the line 51–52 shown in FIG. 2 and the right figure portion is a sectional view taken on the line 61–62 shown in the left figure portion. In the above cases, FIGS. 3A and 3B show the situation immediately after the start of cutting; FIGS. 3C and 3D show the situation in the middle of cutting; and FIGS. 3E and 3F show the situation when the cutting is almost finished.

Because of the modification of the pitch of the grooves formed around the work rollers 1 and 2, the thickness of all the sliced pieces 10a, 10a. . . become equal to one another at the same level. However, as each of the sliced pieces (to be referred to as cylinder pieces, hereinbelow) 10a, 10a . . . are observed, the thickness is uneven within the cut surface, and the sliced piece forms a convex shape.

That is, when viewed from the direction perpendicular to the direction of cutting, the cylinder pieces 10a, 10a . . . have the greatest thickness at their center (designated at 101) and this thickness becomes thinner towards both upper and lower edges (102 and 103). This occurs because the contact length ($l_x$) of the wire 3 with the workpiece 10 immediately after the start of machining and immediately before the end of machining, is at its shortest. This means that the wire 3 will be abraded to a less degree (therefore, the amount of the waste removed becomes greater). In contrast, in the middle of machining, the contact length $l_x$ of the wire 3 with the workpiece 10 becomes maximum so that the wire 3 will be worn away to the greatest degree (therefore, the amount of the waste removed will become small).

This phenomenon is not peculiar to the reciprocating running type but occurs in both the one-way running type and the reciprocating running type. That is, since the cutting by the multi-wire saw is performed by the principle similar to lapping, the running speed of the wire is normally high enough compared to the speed of pushing up the workpiece 10 (if, for example, the speed of wire feeding is 15.6 m/min and the speed of pushing up the workpiece 10 is 5 mm/h, the speed of wire feeding is 18,720 times the pushing-up speed). Further, since also in the reciprocating running type, fresh wire is supplied constantly, the diameter of the wire 3 also varies in the same manner as that in the one-way running type.

Thus, in the conventional multi-wire saw, by the adjustment of the wire pitch as stated above (p1>p2>. . . >p240), the thickness of the sliced cylinder pieces 10a, 10a. . . becomes equal at the same cutting position.

However, when the cylinder pieces 10a, 10a. . . are observed individually, the thickness of each cylinder piece within its cut surface is uneven. In order to prevent the variation of the thickness of the cylinder pieces 10a, 10a. . . due to the ununiformity of the thickness within the cut surface, it is necessary to raise the feeding speed of wire to such a degree that the abraded amount of the wire will be negligible. This means a great increase of the running cost of the machining process.

Even when there is no need to restrict the variation of the thickness within the cut surface of each of the cylinder pieces 10a, 10a. . . , there is still the problem of the wire becoming too abraded. The extent of abrading might cause the wire to snap easily or cause some other problem in usage. The abrasion of the wire was also an inhibiting factor against the improvement of the yield which can be performed by reducing the amount of waste removed.

SUMMARY OF THE INVENTION

The present invention has been achieved in view of the above problems, it is therefore an object of the present invention to provide a wire feeding device for use in a multi-wire saw, in which it is possible to reduce the consumed amount of the wire, or to improve the yield by virtue of the use of a thin-diametric wire, by keeping constant the abraded amount of the wire at all cutting sites in a workpiece to be cut.

In order to achieve the above object, the invention provides the embodiments as follows:

In accordance with the first aspect of the invention, a wire feeding device for use in a multi-wire saw wherein a single wire, one end of which is connected to a feed reel, the other is connected to a collecting reel, is spirally wound between at least two work rollers arranged in parallel, a fixed distance apart, so that turns of the spirally wound wire are separated at predetermined intervals, is constructed such that when the contact length of the wire with a workpiece to be machined varies in the process of cutting, the abraded amount of the wire at any of the cutting positions in the workpiece to be machined is kept constant by adjusting the feeding speed of the wire.

In accordance with the second aspect of the invention, a wire feeding device for use in a multi-wire saw wherein a single wire, one end of which is connected to a feed reel, the other is connected to a collecting reel, is spirally wound between at least two work rollers arranged in parallel, a fixed distance apart, so that turns of the spirally wound wire are separated at predetermined intervals, is constructed such that the feeding speed of the wire is controlled so as to be proportional to the contact length of the wire with a workpiece to be machined.

In accordance with the third aspect of the invention, a wire feeding device for use in a multi-wire saw, having the second feature of the invention, is characterized in that the feeding speed of the wire is controlled following a condition:

$$V = c l_X$$

where c is a proportional constant, $l_X$ designates the contact length and V designates the feeding speed of the wire.

In accordance with the fourth and fifth aspects of the invention, a wire feeding device for use in a multi-wire saw, having the second feature of the invention, is characterized in that the method of wire running is of a one-way running type or a reciprocating running type.

In cutting a workpiece by the multi-wire saw having the above features, the abraded amount of the wire is proportional to the contact length of the wire with the workpiece in the process of cutting. Accordingly, if the contact length is short, the feeding speed of the wire should be set low and if the contact length is long, the feeding speed of the wire is set high. In these condition, the abraded amount of the wire-can be kept constant within all the planes of cutting the workpiece to be machined. In this way, the waste removed at cutting can become the same throughout the entire part of each cutting plane, so that the thickness can be uniform within the surface of the sliced piece.

DESCRIPTION OF THE PREFERRED EMBODIMENTS

Figure 1:
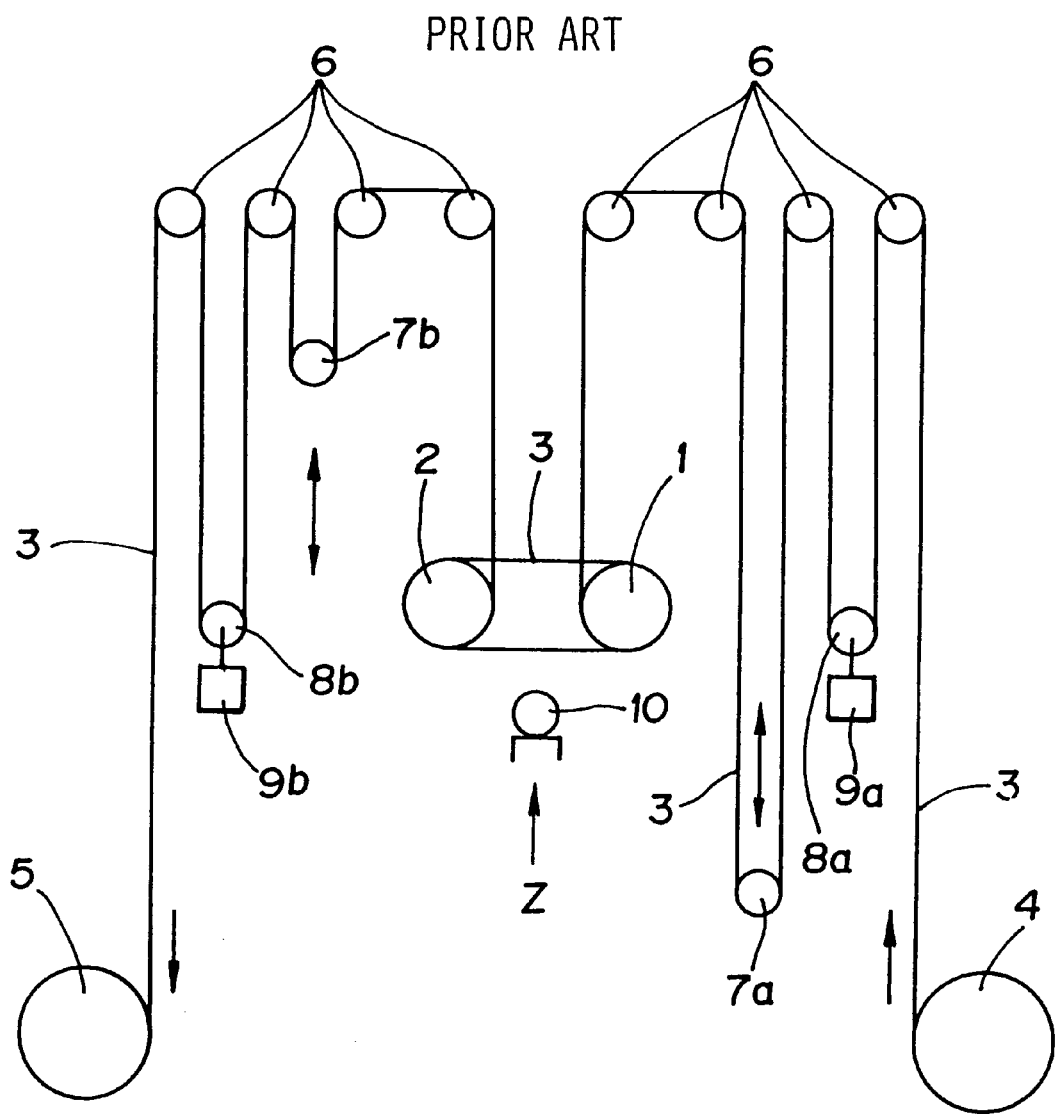
FIG. 1 is an overall view showing a multi-wire saw viewed from the front side.
Figure 2:
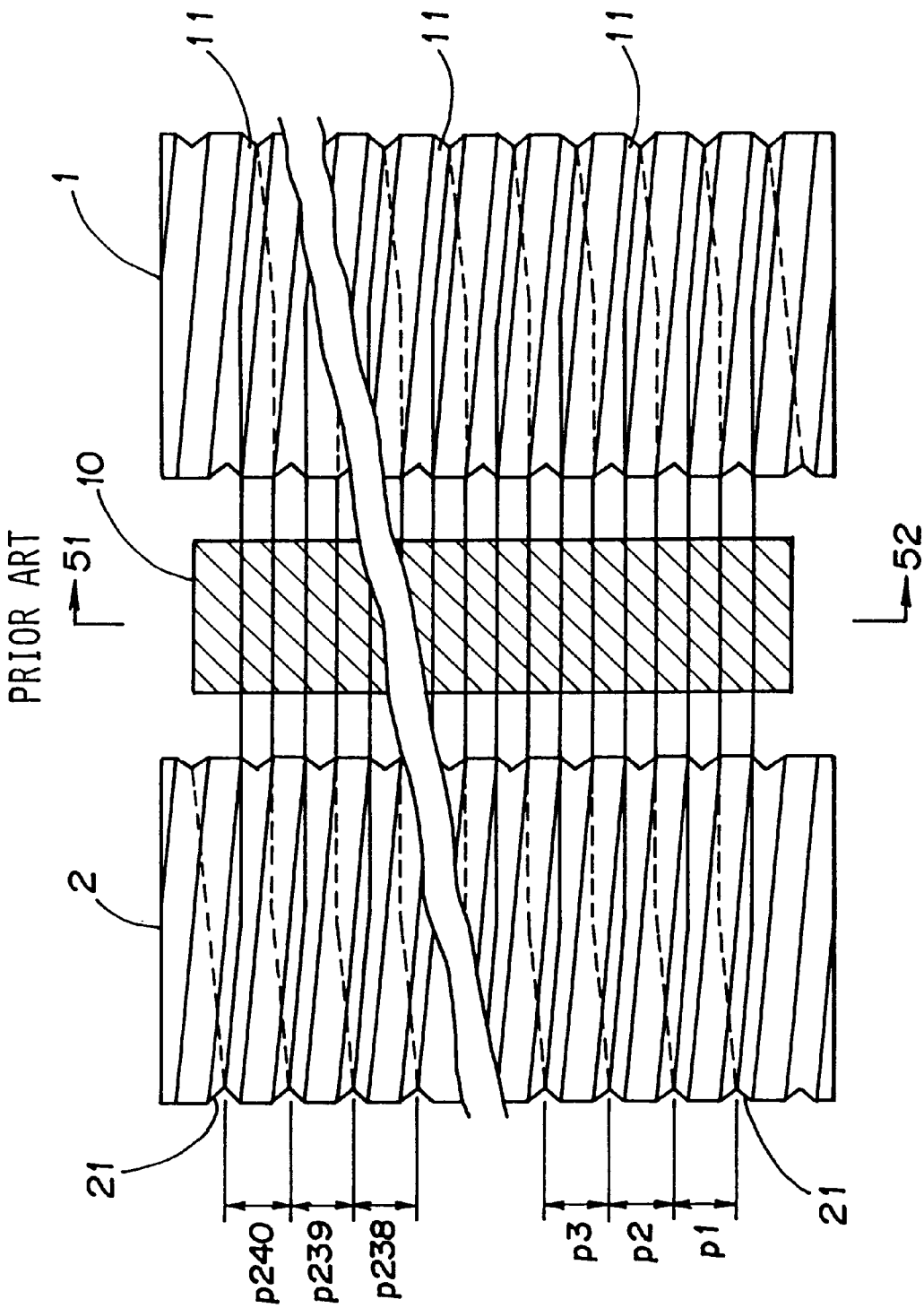
FIG. 2 is an overall view showing the multi-wire saw viewed from the top.
Figure 3A:
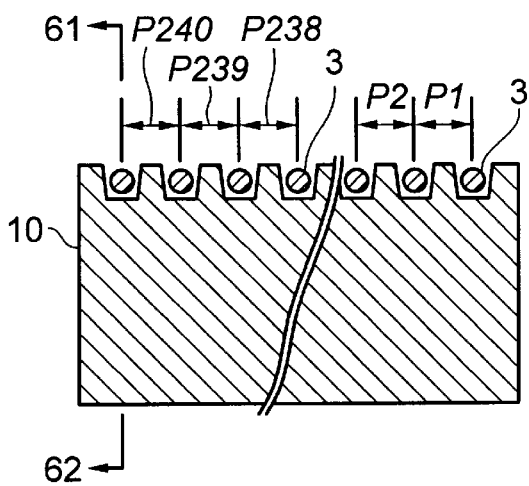
FIGS. 3A and 3B are views showing the situation when a cylindrical workpiece is machined, particularly, showing the relation between the thickness of cylinder pieces and the wire diameter during the process of cutting immediately after the start of cutting.
Figure 3B:
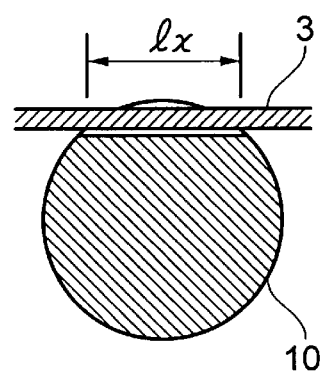
Figure 3C:
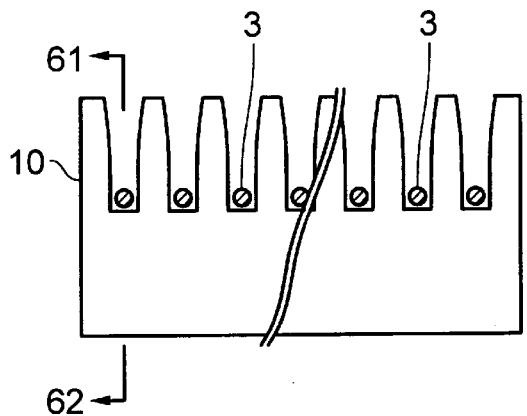
FIGS. 3C and 3D are views showing the relation in the middle of cutting in the same machining process of FIGS. 3A and 3B.
Figure 3D:
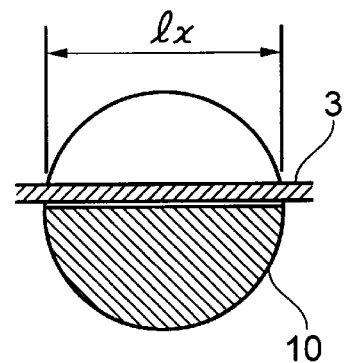
Figure 3E:
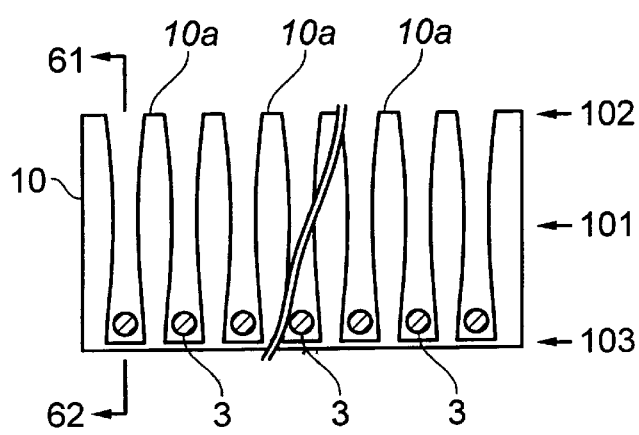
FIGS. 3E and 3F are views showing the relation when the cutting is almost finished, in the same machining process of FIG. 3A.
Figure 3F:
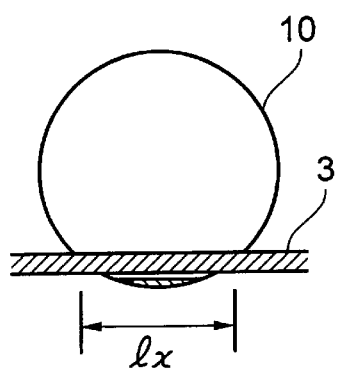

Embodiments of the invention will be described with reference to the drawings. Here, the structure of the multi-wire saw itself used in the invention is the same as illustrated in the conventional art in FIGS. 1 and 2, therefore the following description will be made using the same reference numerals used in those figures.

The wire feeding device of the multi-wire saw in accordance with the invention is adapted to keep the abraded amount of the wire at a constant rate at each cutting position in the workpiece 10 to be machined, by adjusting the feeding speed of the wire 3 when the contact length $l_X$ of the wire 3 with the workpiece 10 to be machined varies in the course of the cutting operation.

Here, the adjustment of the feeding speed specifically means that the feeding speed of the wire 3 is controlled in proportion to the contact length $l_X$ of the wire 3 with the workpiece 10 to be cut.

The abraded amount of the wire 3 is proportion to the contact length $l_X$ of the wire 3 with the workpiece 10 during the cutting operation. Accordingly, the abraded amount of the wire within each cutting plane of the workpiece to be machined is kept constant by controlling the feeding speed wire so that when the contact length $l_x$ is short, the feeding speed of the wire 3 is made slower and when the contact length $l_x$ is long, the speed is increased. Thus, the amount of the waste removed at all parts within the entire cut plane throughout the workpiece, becomes uniform, so that the thickness within each sliced pieces is made uniform.

Here, suppose that r designates a radius of the workpiece 10, the position of the workpiece 10 when the wire 3 comes into contact with it is represented by h=0, and the position of the workpiece when the wire 3 has finished cutting it is represented by h=2r, the contact length $l_x$ between the workpiece 10 and the wire 3 is represented as follows:

$$l_x = 2[h(2r-h)]^{1/2} \quad (1)$$

Accordingly, the ideal feeding speed v of the wire is $$v = c l_x \quad (2)$$

where c is a proportional constant.

The present invention is to control the device so that the feeding speed v of the wire 3 will satisfy the condition shown in formula (2) during the cutting operation of the workpiece 10.

[Embodiment]

In order to have the content of the invention understood more easily, a specific embodiment of the invention will be described hereinbelow.

In this embodiment, the workpiece 10 is assumed to be a cylinder having a height of 100 mm with a diameter of 52 mm. The multi-wire saw to be used is of the reciprocating running type in which the wire 3 with 0.1 mm in diameter reciprocates between the two work rollers 1 and 2. The pushing-up speed of the workpiece 10 is set at 5 mm/h. The workpiece 10 is cut by planes perpendicular to the height direction, into 240 cylinder pieces 10a, 10a... of 0.3 mm in their height.

Figure 4A:
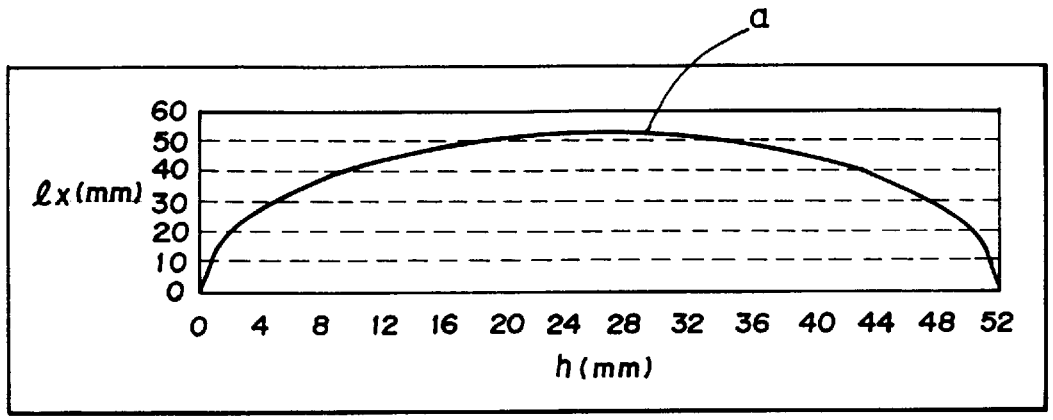
FIG. 4A is a graph showing the variation of the contact length of the wire with the workpiece during the process of cutting the workpiece.

When the workpiece 10 is machined following the above conditions, the variation of the contact length $l_x$ of the wire 3 with the workpiece 10 from the stage (h=0) where the wire 3 comes into contact with the workpiece 10, to the stage (h=2r=52 mm) where the wire 3 has finished cutting the workpiece 10, will be represented by a curve "a" as shown in FIG. 4A, in accordance with the above formula (1).

Figure 4B:
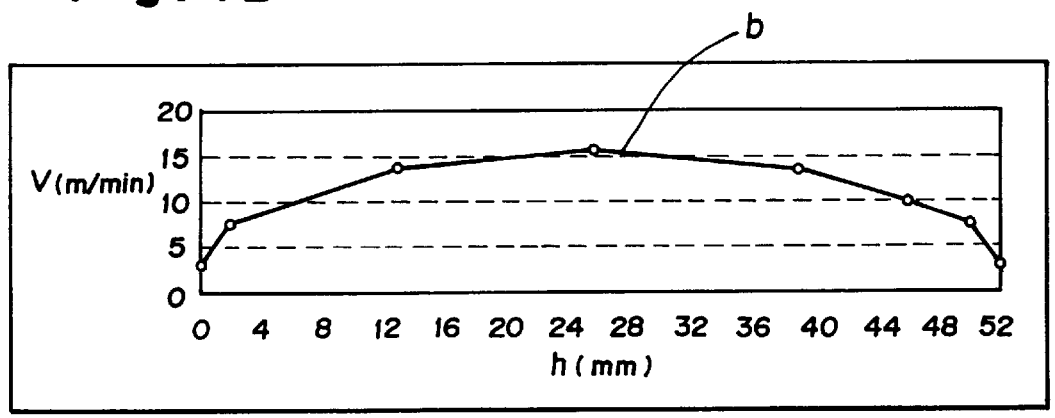
FIG. 4B is a graph showing the change of the feeding speed of the wire during the process of cutting the workpiece.

Therefore, the variation of the feeding speed v of the wire 3 from the stage (h=0) where the wire 3 comes into contact with the work piece 10, to the stage (h=2r=52 mm) where the wire 3 has finished cutting the workpiece 10, should be controlled so as to obtain a flexed line curve "b" shown in FIG. 4B which is approximated from the above formulae (1) based on the formula (2). Here, the calculation is made using the proportional constant c=300 [min$^{-1}$].

That is, in this embodiment, the wire feeding device of the multi-wire saw is controlled based on the programmed operation consisting of eight steps where the feeding speed of the wire is changed in relation to the flexed line curve shown in FIG. 4B which approximates the curve defined by the above formula (1).

Figure 5B:
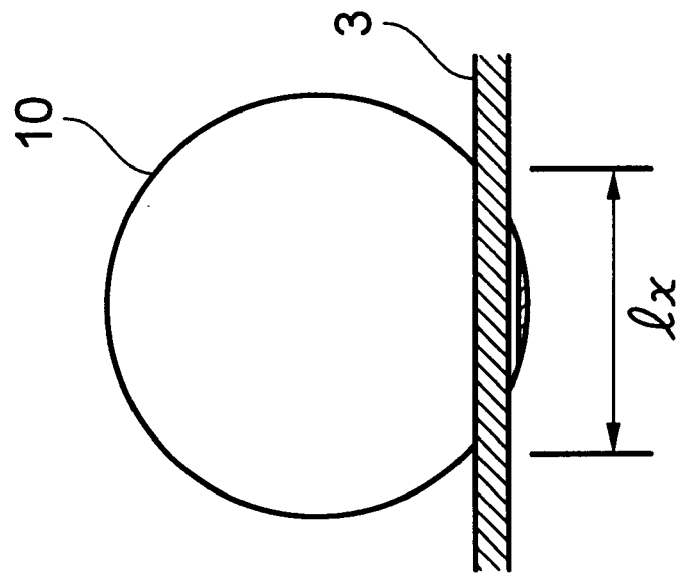
FIGS. 5A and 5B are views showing the relation between the diameter of the wire and the thickness of the cylinder pieces when the feeding speed of the wire is controlled so as to be in proportion to the contact length.
Figure 5A:
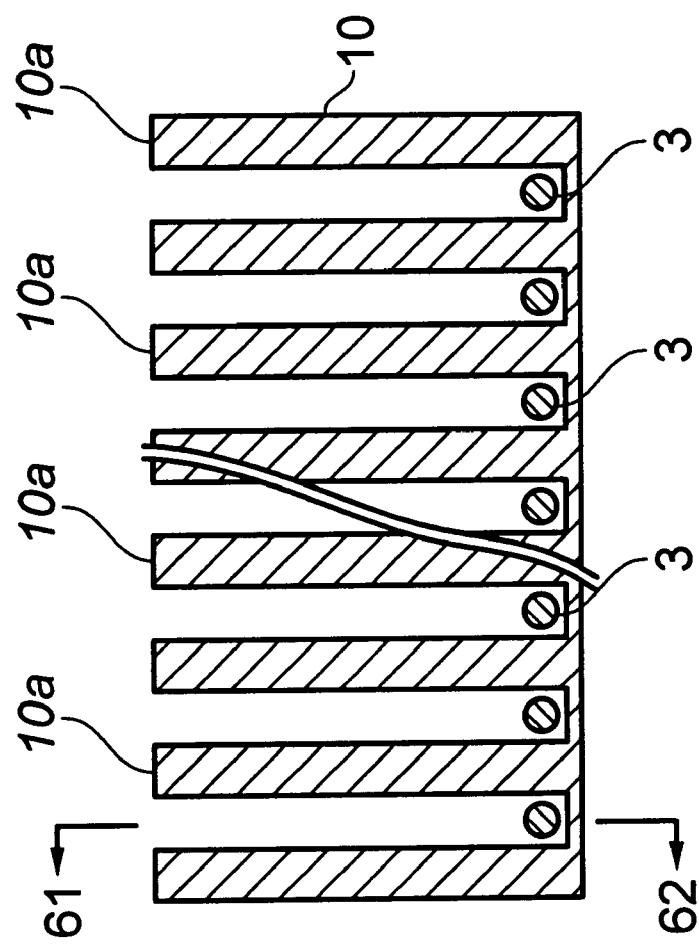

FIGS. 5A and 5B are views showing the relation between the diameter of the wire 3 and the thickness of the cylinder pieces 10a, 10a... when the workpiece 10 was machined by controlling the feeding speed v of the wire 3, based on the above programming. As seen from FIGS. 5A and 5B, when the feeding speed v of the wire 3 was controlled so as to be proportional to the contact length $l_x$ of the wire 3 with the workpiece 10, the abraded amount of the wire 3 became constant within each of the cutting planes of the workpiece, whereby the waste removed at cutting became the same throughout the entire part of each cutting plane. Therefore, the thickness could be made approximately uniform over the cut surface for each of the sliced pieces.

Figures 6A, 6B:
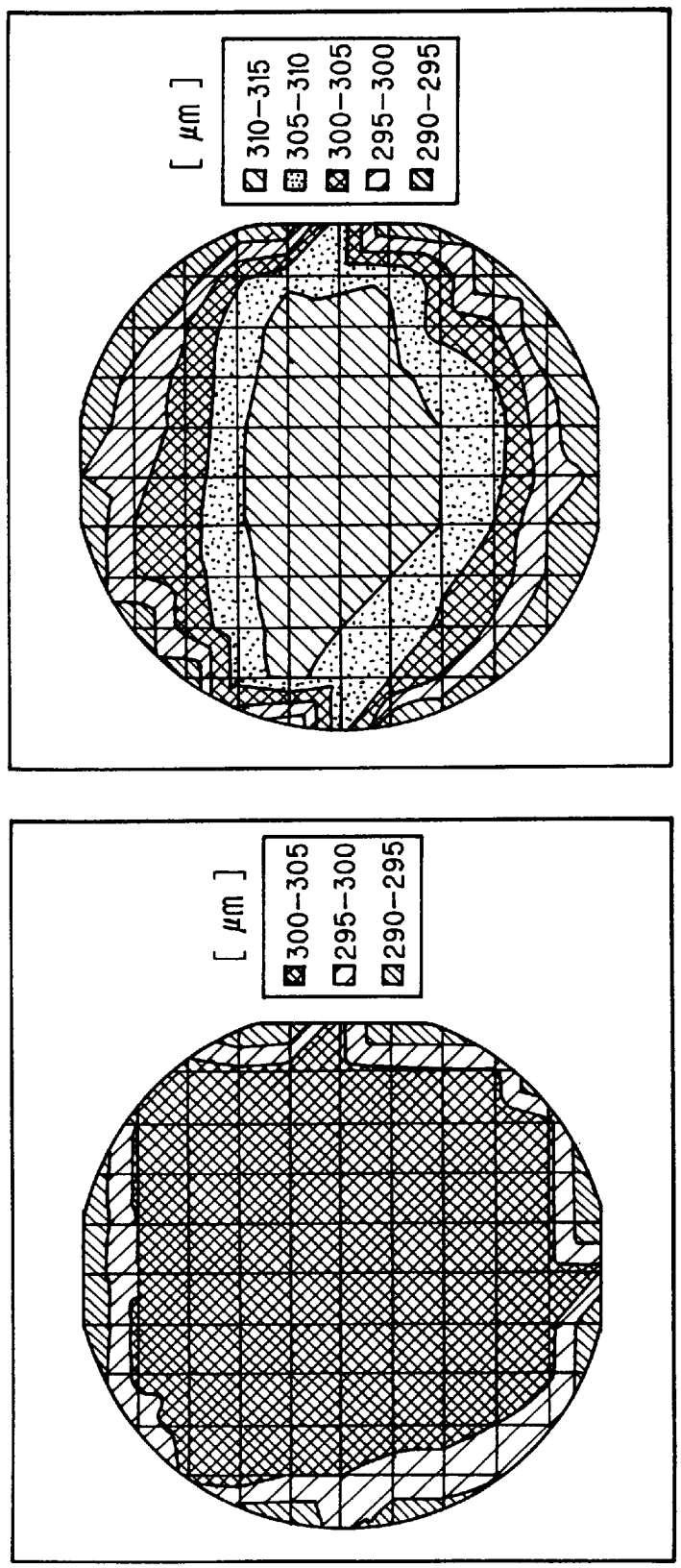
FIG. 6A is a view showing the processed result when the feeding speed of the wire is controlled so as to be proportional to the contact length.
FIG. 6B is a view showing the processed result when the feeding speed of the wire is set at constant.

FIG. 6A is a view showing the resultant surface condition of the machined piece (the variation in thickness over the entire part of the sliced cylinder piece 10a) with the condition that the feeding speed v of the wire 3 was controlled based on the programmed process set up as in FIG. 4B. As a comparative example, FIG. 6B shows the machined surface condition of the sliced piece (the variation in thickness over the entire part of the sliced cylinder piece 10a) on the condition that the feeding speed v of the wire 3 was set at a constant value, i.e., 5.6 m/min (see FIG. 4C).

As is apparent from FIGS. 6A and 6B, the thickness of the piece which was machined based on the control scheme of the invention, where the feeding speed of the wire 3 was controlled in proportion to the contact length $l_x$, was more uniform over the entire surface as compared to that of the prior art.

Figure 4C:
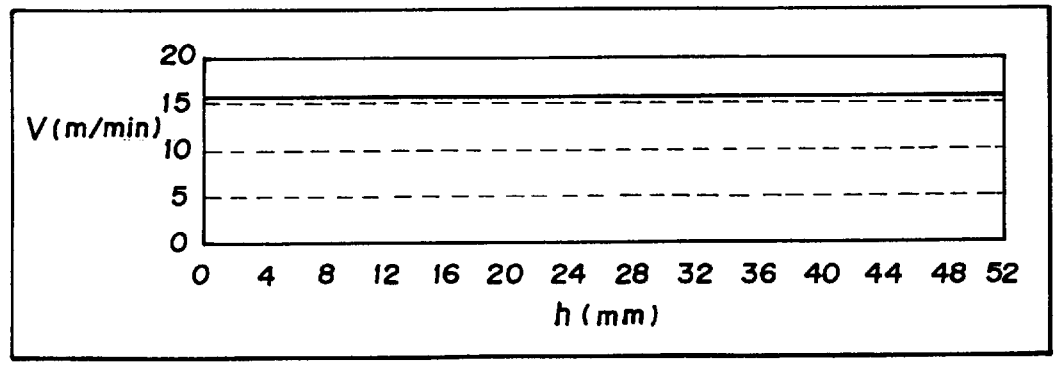
FIG. 4C is a graph showing a case where the feeding speed of the wire is set at constant during the process of cutting the workpiece.

As is apparent from FIGS. 4B and 4C, the consumed amount of the wire 3 is smaller in this invention than in the prior art.

As shown from the above embodiment, the wire feeding device of the multi-wire saw in accordance with the invention, is constructed so that when the contact length of the wire with the workpiece to be machined varies in the process of cutting, the feeding speed of the wire should be varied in proportion to the contact length. In this way, it is possible to slice the workpiece into piece having excellent surface uniformity of thickness. Further, the consumption of the wire can be reduced, which means a reduction in the running cost. Moreover, the thin-diametric wire (for example, wire having a diameter of 0.1 mm) which was hard to use in the conventional multi-wire saw, can be used to machine without wire snapping, it is possible to improve the production yield by the reduction of the waste removed when the workpiece is cut.

What is claimed is:

1. A method of machining a workpiece by cutting with a multi-wire saw comprising the steps of:
    a. contacting a workpiece with a contact length of the wire,
    b. varying the contact length of the wire during cutting, and
    c. varying a speed of the wire during cutting so that abrading of the wire caused by cutting is kept constant.

2. A method of machining a workpiece by cutting with a multi-wire saw comprising the steps of:
    a. contacting a workpiece with a contact length of the wire,
    b. varying the contact length of the wire with the workpiece during cutting, and
    c. controlling a feeding speed of the wire in proportion to the contact length, so that abrading of the wire caused by cutting is kept constant.

3. The method according to claim 2, wherein the controlling of the feeding speed of the wire is controlled following a condition:

$$V = c l_x$$

where c is a proportional constant, $l_x$ designates the contact length of the wire with a workpiece to be machined and V designates the feeding speed of the wire.

* * * * *